United States Patent
Cole et al.

(10) Patent No.: US 6,445,912 B1
(45) Date of Patent: Sep. 3, 2002

(54) SYSTEM AND METHOD FOR CHECKING SERVICE AVAILABILITY

(75) Inventors: Allen Cole, Redmond; Susan Engquist, Seattle; Xinguo Wei, Issaquah, all of WA (US)

(73) Assignee: AT&T Wireless Services, Inc., Redmond, WA (US)

(*) Notice: Subject to any disclaimer, the term of this patent is extended or adjusted under 35 U.S.C. 154(b) by 0 days.

(21) Appl. No.: 09/572,144

(22) Filed: May 17, 2000

Related U.S. Application Data
(60) Provisional application No. 60/140,620, filed on Jun. 23, 1999.

(51) Int. Cl.⁷ .............................................. H04M 11/00
(52) U.S. Cl. ...................... 455/406; 455/422; 455/424; 455/456
(58) Field of Search ................... 455/406–408, 455/419, 423, 422, 424, 446, 456, 457; 705/1, 26

(56) References Cited

U.S. PATENT DOCUMENTS

| | | | |
|---|---|---|---|
| 4,873,513 A | 10/1989 | Soults et al. ................. 340/723 |
| 5,423,067 A | 6/1995 | Manabe ...................... 455/56.1 |
| 5,561,839 A | 10/1996 | Osterberg et al. ........... 455/33.1 |
| 5,644,619 A | 7/1997 | Farris et al. .................... 379/27 |
| 5,668,562 A | 9/1997 | Cutrer et al. ................. 343/703 |
| 5,710,758 A | 1/1998 | Soliman et al. ............. 370/241 |
| 5,751,802 A | 5/1998 | Carr et al. .................... 379/201 |
| 5,796,634 A | 8/1998 | Craport et al. ............... 364/559 |
| 5,881,131 A | 3/1999 | Farris et al. .................... 379/27 |
| 5,920,846 A | 7/1999 | Storch et al. .................... 705/7 |
| 5,946,611 A | 8/1999 | Dennison et al. |

FOREIGN PATENT DOCUMENTS

WO    WO99/12226    3/1999

OTHER PUBLICATIONS

PCT, Notification Transmittal and International Search Report for PCT/US 00/40057, Mailed Sep. 15, 2000, (6 pages).

*Primary Examiner*—Nay Maung
*Assistant Examiner*—Raymond B. Persino
(74) *Attorney, Agent, or Firm*—Gray Cary Ware & Freidenrich

(57) ABSTRACT

A method has been provided for automatically defining the communication services available to a potential subscriber on the basis of street address. The method is able to provide rate center information in response to the submission of a street address. The method is especially advantageous when applied to fixed-position wireless systems, such as AT&T's Fixed Wireless System (FWS), where the additional complication of determining the radio frequency (RF) coverage available to subscribers is involved. The method determines the base station associated with the street address and applies the business rules of that station to a new subscriber to determine service availability. The RF coverage and business rules determinations are made in response to the submission of a street address. A system for determining service availability in response to the submission of a subscriber address has also been provided.

42 Claims, 13 Drawing Sheets

SYSTEM AND METHOD FOR CHECKING SERVICE AVAILABILITY

RELATED APPLICATION

This application claims the benefit of U.S. Provisional Application No. 60/140,620, filed Jun. 23, 1999 and entitled "Method for Checking Service Availability" which is incorporated herein in its entirety.

This application is related to PCT application number PCT/US00/40057, filed Jun. 2, 2000 and entitled "System and Method for Checking Service Availability".

BACKGROUND OF THE INVENTION

The present invention relates generally to the field of wireless communication services and, more particularly, to a system and method of determining the availability of wireless communication services to a new subscriber in a communications network.

Subscribers to conventional landline telephone services are registered with respect to a given street address or other fixed location. Even where landline telephone infrastructure is well established, a new subscriber must be located in the system. The given address is located inside a rate center. Although there are variations between carriers, a rate center is generally defined to be a set of geographical boundaries used by telephone companies to determine interexchange service charges. A rate center therefore is a bounded geographical area subdivided for telephone services, by addresses.

Communication networks use an electronic database, or at least a system of conventional maps, to define the boundaries between rate centers. The street address given by the new subscriber is located on this map, or in this database. Files for the purpose of servicing and billing the new subscriber cannot be established until the street address is located in a rate center. Locating the street address in a rate center can be cumbersome process. A human operator must enter the appropriate data, manipulate the maps, and initiate the correct procedures to assign the subscriber a telephone number and establish a file for billing purposes.

U.S. telecommunication networks consist of a geography of more than 20,000 wire center serving areas. These central switching areas, which are also known as end offices (EOs) or local exchanges (LEs), act as feeders in the distribution of services to telephone subscribers. Each wire center has one or more switches which control the first 6 digits (area code plus the following three digits) of a ten-digit telephone number. A critical requirement for any new service provider operating a wire center in a local loop market is the maintenance of a billing structure for the inbound calls which is the same as that charged by a previous provider. For example, if a subscriber switches their local telephone service to a new service provider, the subscriber will typically get a new telephone number from the new service provider. People making local calls to the new number should expect to receive the same billing rate as was charged for the old number. In other words, with a change of service provider, a call should not change from local to long distance, or vice versa. To meet this requirement, the new local telephone company must find the rate center the subscriber resides in, and assign a new telephone number from the numbering pool available from that rate center.

The advent of fixed-place wireless communications systems, such as AT&T's Fixed Wireless System (FWS), expands the communication potentials available for the average user who is currently being served by a landline telephone. Although the FWS is wireless, it is designed to transfer data between a subscriber premises at a street address and a base station, both of which remain stationary. However, it is critical that a local FWS base station be able to communicate with the remote sites associated with the street address with a high degree of confidence. Therefore, the radio frequency (RF) "footprint" of the base stations, and the potential RF coverage available to potential subscribers (remote units) must be known at the time a new user is requesting the service. An area of RF coverage therefore is a bounded geographical area in which reliable wireless communications can be conducted. Service to each RF coverage area is provided by at least one base station, or multiple base stations which provide overlapping coverage inside the RF coverage area.

To request service in an FWS communications network, a new subscriber's street address must be located in the network by rate center, and the RF coverage available at that street address must be known before the request can be granted or a telephone number assigned.

It would be advantageous if the street address of a new subscriber could automatically be located in a rate center with just the entry of the service address.

It would be advantageous if the RF coverage available in a communications network could be correlated with a communications network database of geographic locations.

It would be advantageous if the RF coverage available for a new subscriber to a fixed position wireless communications service could be ascertained in response to the entry of the subscriber's street address.

SUMMARY OF THE INVENTION

Accordingly, a method is provided for determining the availability of wireless service to potential customers in a communications network. From communications network information concerning the location of rate center and areas of RF coverage, the method entails: receiving an address for the determination of service availability; accessing the rate center and RF coverage information in response to receiving the address; and locating the address in one of the of rate centers determining RF coverage in the area where the address is located; and assigning service to the address if RF coverage is available.

From the determination of rate center and RF coverage, the appropriate service availability can be assigned to the subscriber. Typically, each area of RF coverage has a corresponding set of business rules. Once a base station associated with the RF coverage area is known, the business rules applicable to that base station can be determined and applied to the subscriber. For example, the rules may concern the availability of new service based upon the number of subscribers already using the base station.

A system is also provided for determining the availability of communications services to a network subscriber with a premises address. The system comprises a service coverage and location (SCL) server including a database of rate centers in the network. The SCL includes an application to convert addresses to locations in the rate centers. In response to the entry of an address, a rate center associated with the address is determined. An SCL interfaces with a SCL user interface, the SCL user interface provides the address to the SCL, and accepts the determined rate center in response to submitting the address.

Where the communications network includes a fixed-position remote link to the subscriber, the SCL server includes a database of geographically located areas of RF coverage. The SCL server application locates the subscriber address in an area of RF coverage and determines the availability of service in response to RF coverage of the area in which the submitted address is located.

DETAILED DESCRIPTION OF THE PREFERRED EMBODIMENT

Figure 1:
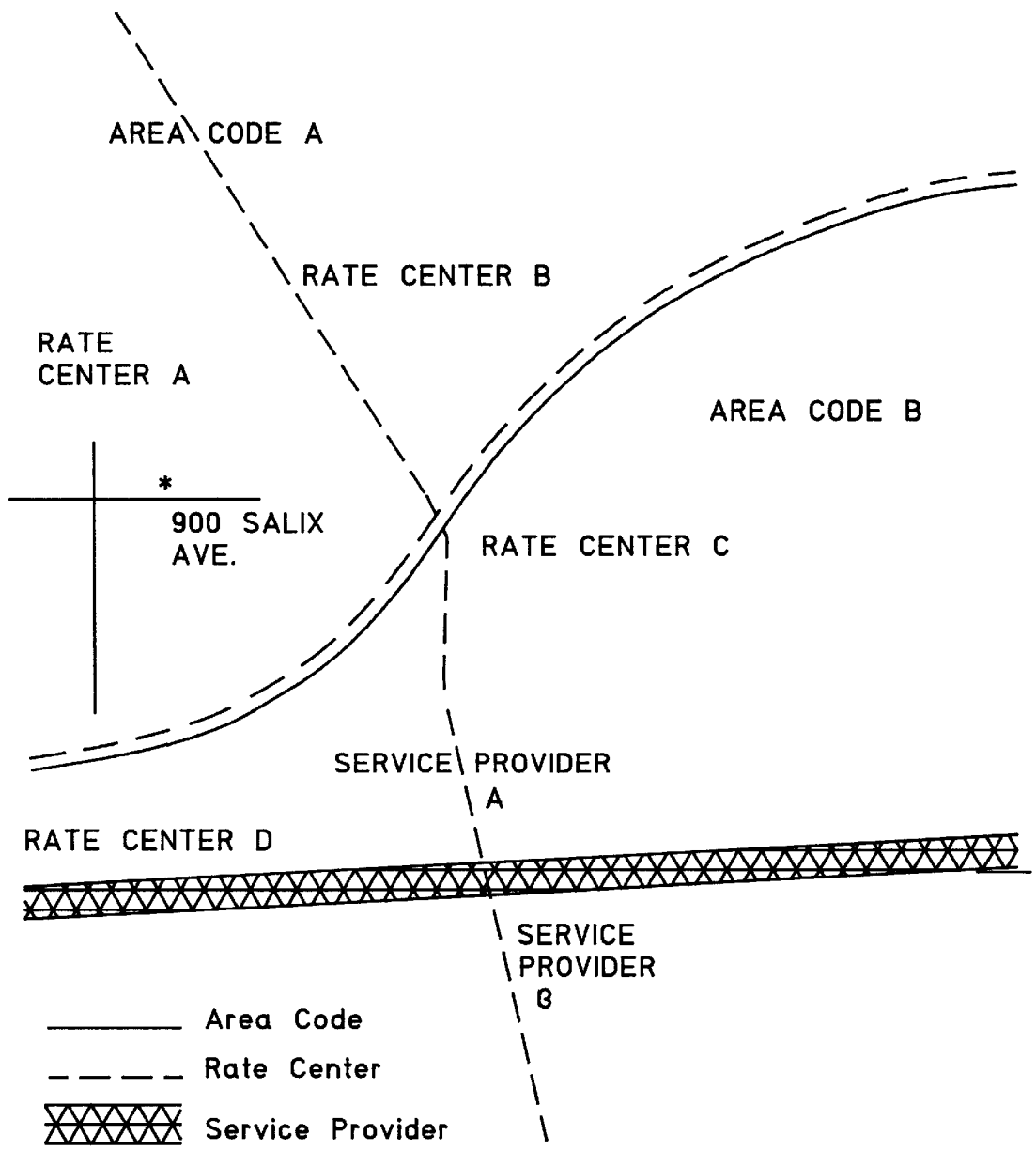
FIG. 1 illustrates an exemplary communications network layout of rate centers.

FIG. 1 illustrates an exemplary communications network of rate centers. A new subscriber is shown requesting service to a street address at 900 Salix Ave. A communications service representative, representing service provider A in the acceptance of a service request, must make several determinations before that request for service is granted, and the subscriber given a telephone number. First, it must be determined if the subscriber is even in an area in which the provider offers services. Service provider A covers areas associated with area codes A and B, and with rate centers A, B, C, and D. Provider B is associated with area code B, and rate centers C and D.

Second, the service representative must determine whether the address is covered by area code A or B. Once the area code is determined, the rate center must be determined. Other communications networks may have alternate, or additional divisions of service; however; the definition of rate center as used herein is the differentiation of network service billing on the basis of a fixed-position geographic location. Once the address has been located in the correct rate center, a file can be opened for billing, and a telephone number, including prefix and area code, can be assigned to the subscriber.

Figure 2:
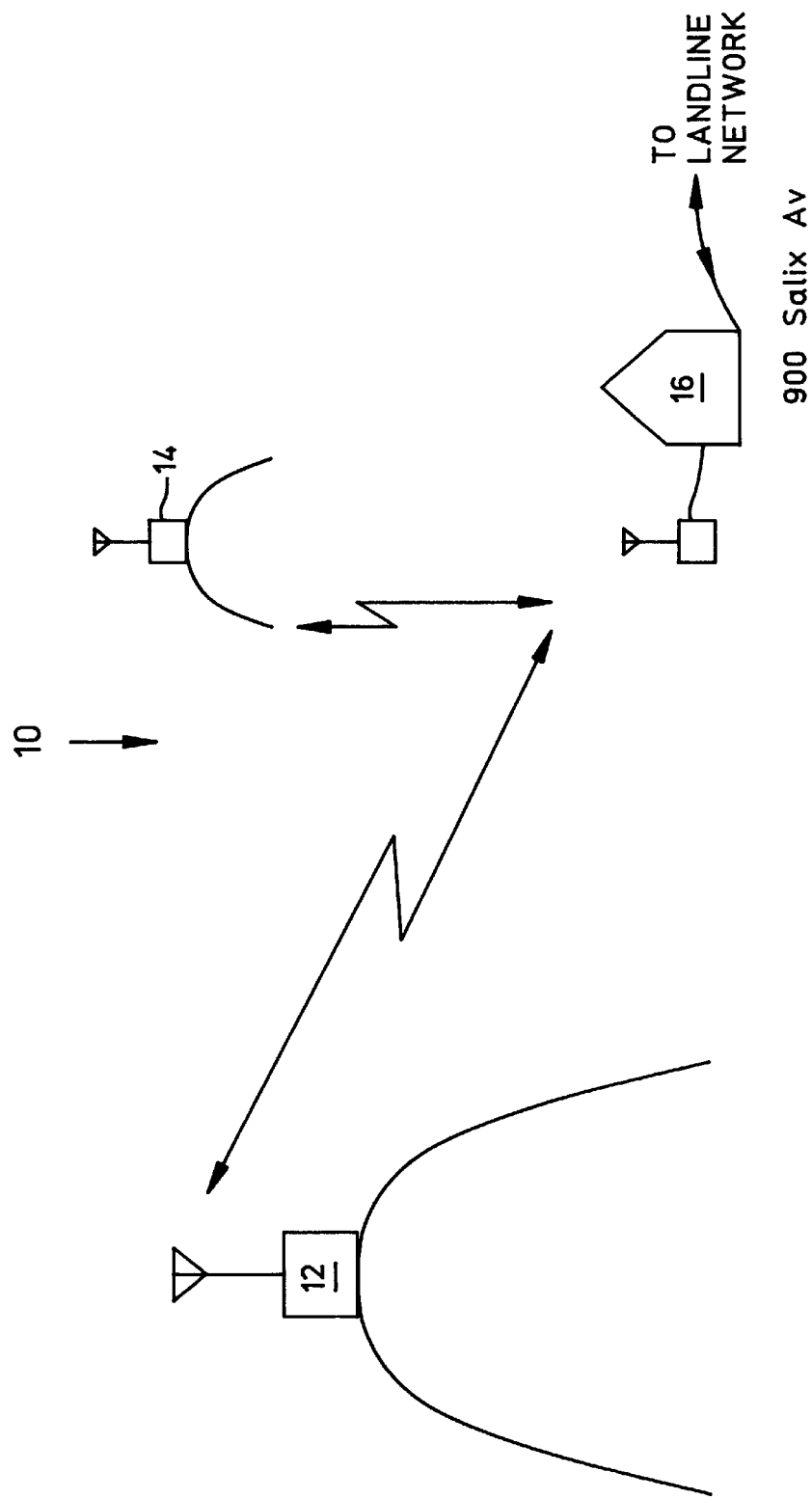
FIG. 2 illustrates portions of an exemplary fixed-position wireless communications network.

FIG. 2 illustrates portions of an exemplary fixed-position wireless communications network 10. In a communication system offering fixed-position wireless services to a remote site associated with the street address of a subscriber, additional concerns are raised. The positions of the base stations, such as base stations 12 and 14, must be known, as well as the RF coverage they provide to remote unit 16.

Figure 3:
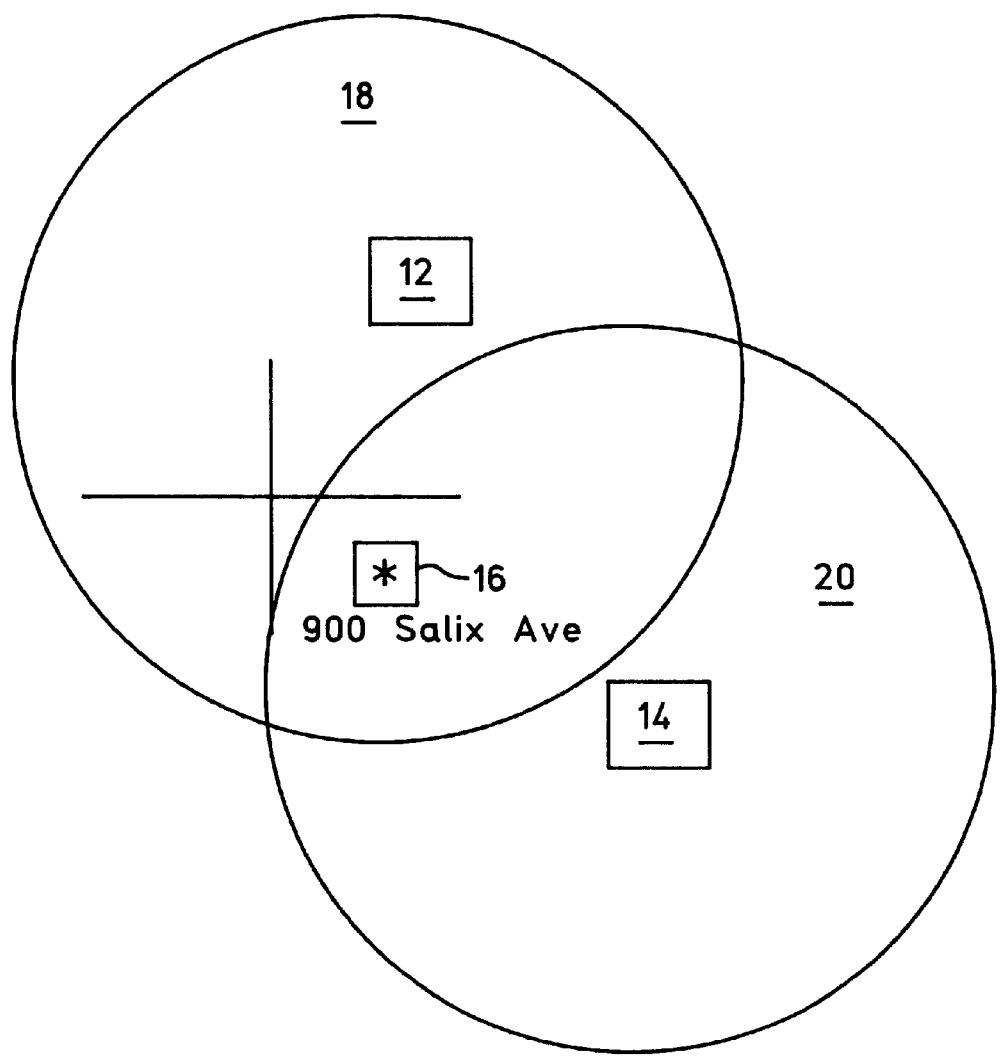
FIG. 3 illustrates the areas of RF coverage offered by the base stations of FIG. 2.

FIG. 3 illustrates the areas of RF coverage offered by the base stations 12 and 14 of FIG. 2. Base station 12 creates an area of coverage 18, while base station 14 creates an area of coverage 20. From FIG. 3, it appears that both stations provide cover to the remote unit 16. Base station 12 appears to provide more complete coverage in the area surrounding remote unit 16; however, a lack of capacity or other business concerns may necessitate that coverage be provided by base station 14. In many situations, however, the subscriber is only covered by a single base station, if at all. Then, the rule-set of the RF coverage area is the business rules of the covering base station.

Figure 4:
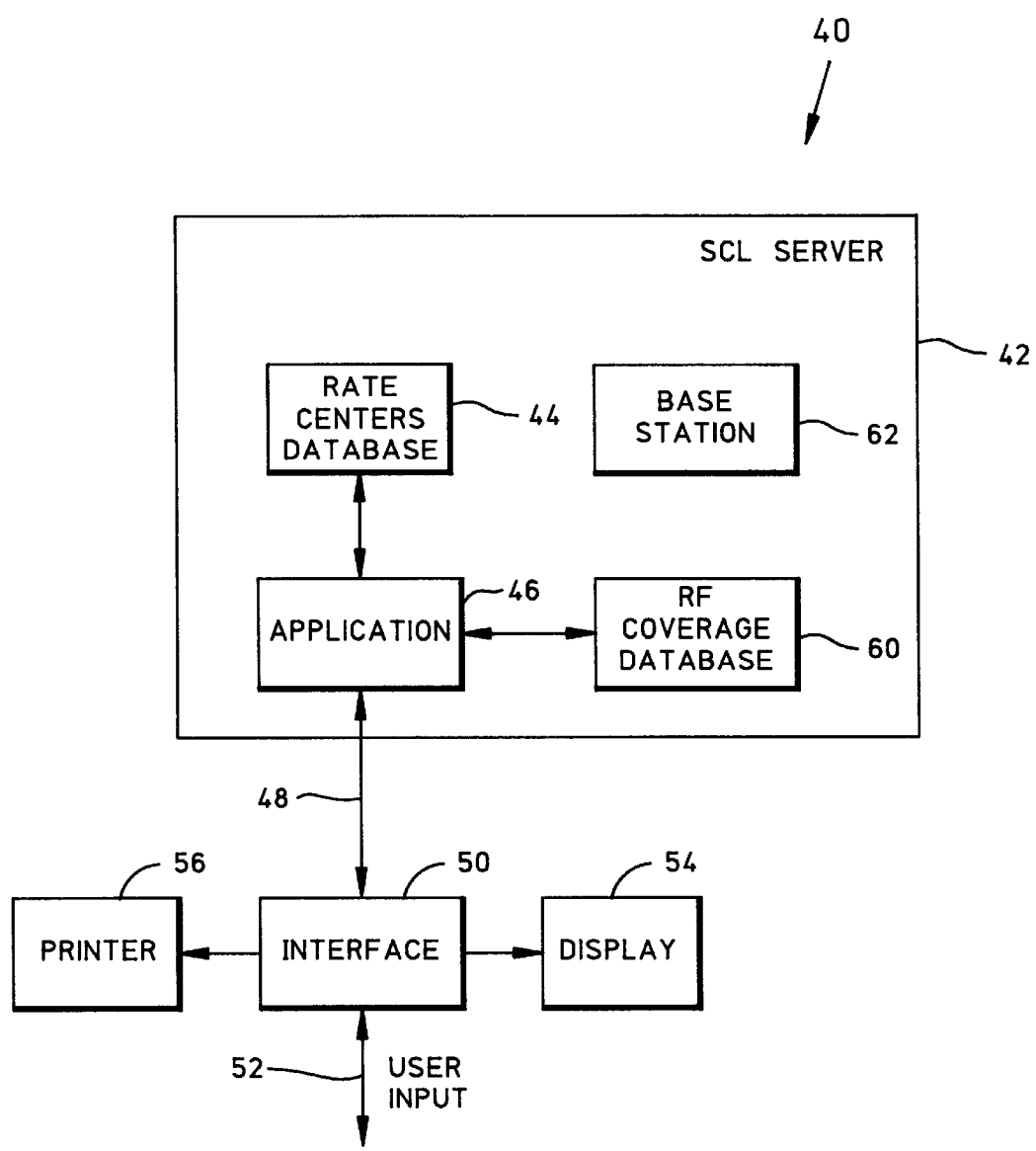
FIG. 4 is a block diagram illustrating the present invention system for determining the availability of communications services to a network subscriber with a premises address.

FIG. 4 is a block diagram illustrating the present invention's system for determining the availability of communications services to a network subscriber with a premises address. The system 40 comprises a service coverage and location (SCL) server 42 including a database 44 of geographically oriented rate centers in the communication network. The SCL server 42 includes an application 46 to convert addresses to geographically located positions, or locations. The application 46 determines a rate center associated with a premises address. Other network processes provide a telephone number for the submitted address as a result of determining the correct rate center, As is well known in the art, the application need not reside in the SCL server 42, but is shown co-located to interface with the rate center data base 44 for simplicity.

The SCL server has a port on line 48 to accept the address and to provide the determined rate center. A SCL user interface 50 accepts the submitted address from the user on line 52. Line 52 represents a keyboard, mouse, voice interface, or storage media interface. Alternately, line 52 is connected to a remote site through a modem, Internet type link, or the like. The user interface 50 provides the determined rate center on a display 54, printer 56, as an electrical signal to a remote site on line 52, or the like. Likewise, the interface 50 has a port connected on line 48 to the SCL server 42, or application 46, to submit the address and accept the determined rate center.

In some aspects of the invention, the communications network is a wireless communications network providing wireless services to remote units at fixed locations. Then, the SCL server 42, or a linked server (not shown), includes a base station database, with the business rules that apply to each base station. Alternately, the base station database 62 is part of the RF coverage database 60. Further, the base station, RF coverage, and rate center databases are the same in some aspects of the invention. The application 46 generates a relationship between base stations and areas of RF coverage. The base station database 62 also includes a set of business rules associated with each base station. The application 46 selects the base station associated with the RF coverage area in which the submitted address is located. Then, the application 46 determines the service availability in response to the business rules that are applied to the submitted address.

The business rules may include a base station priority status in some aspects of the invention, so that the a base station can be chosen in the event the subscribing address is covered by multiple base stations. Often, the subscriber address is located in an area that is only covered by a single base station. Then, the rule-set of that single covering base station is applied to analyze the service availability of the subscriber address.

It is also typical for the communications system to include a plurality of wireless remote units, where each remote unit corresponds to an address where service is available. Referring briefly to FIGS. 2 and 3, although only one remote unit 16 is shown for simplicity, the number of remote units in the network far outnumber the number of base stations.

In some aspects of the invention, the SCL user interface 50 or a similar device accepts RF coverage and business rule updates on line 52. The updates are communicated to the SCL server 42 on line 48 to update the RF coverage and business rule databases 60 and 62.

In some aspects of the invention, the SCL server 42 and the SCL server interface 50 are connected on line 48 through a communications system selected from the group consisting of landline telephone, wireless telephone, and Internet.

Figure 5:
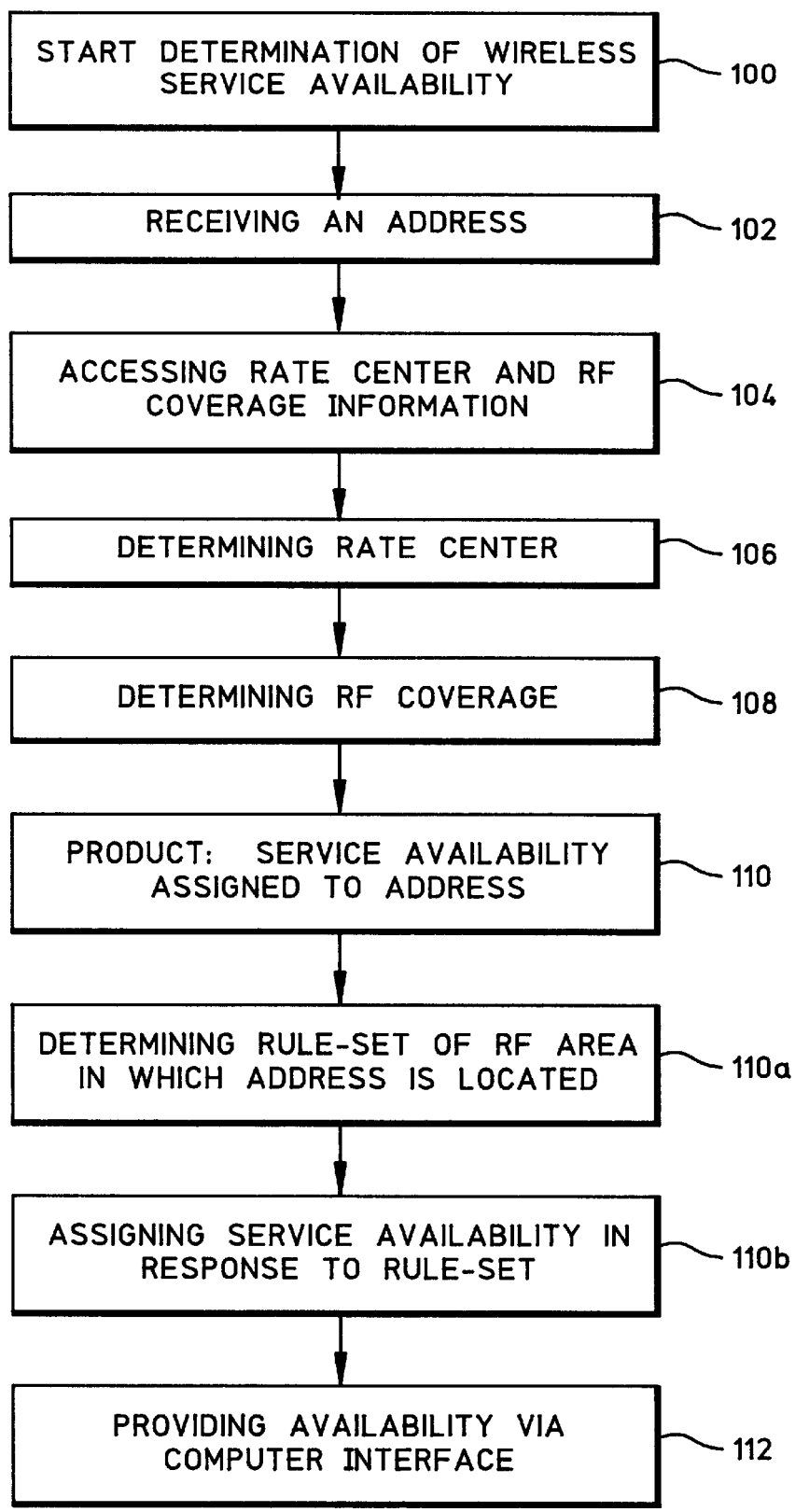
FIG. 5 is a flowchart illustrating the present invention method for checking the availability of wireless service to a communications network subscriber.

FIG. 5 is a flowchart illustrating the present inventive method for determining the availability of wireless service to a communications network subscriber. The process below is depicted as a series of numbered steps for clarity, however, no process order should be inferred from the numbering unless explicitly stated. Step 100 begins with a communication network included rate center information with regard to a plurality of rate centers, as well as RF coverage information with respect to a plurality of RF coverage areas. Step 102 receives an address for the determination of service availability. Step 104 accesses rate center and RF coverage information in response to receiving the address. Typically, the received address is converted into a geographic location. Step 106 determines the rate center in which the address is located. Step 108 determines from the RF coverage information, an RF coverage area in which the address is located. Step 110 is a product where service availability is assigned to a subscriber if RF coverage is available.

Typically, the communications network includes a set of rules, or rule-set for each RF coverage area. Step 110 includes sub-steps. Step 110*a* determines the set of rules corresponding to the RF coverage area in which the address is located. Step 110*b* assigns service availability to the address in response to the RF coverage rule-set.

Typically, the communications network includes a plurality of base stations to provide RF operations and coverage in the plurality of RF coverage areas. The communications network also includes information concerning the relationship between base stations and RF coverage areas, and the business rules associated with each base station. The business rules grant service availability on the basis of base station capacity and base station availability. Step 110*a* selects the base station corresponding to the RF coverage area in which the address is located. Step 110*b* applies the business rules of the selected base station to the address.

Therefore, the assignment of service availability in Step 110 includes assigning service availability to the address in response to the base station business rules. Step 110 includes assigning service availability from the options including service granted, service unavailable due to no base station coverage, service unavailable due to poor RF coverage, service unavailable due to base station low capacity, and service unavailable due to the base station being unavailable for use.

As shown in FIG. 4, the communications network includes a computer, or server, with a computer interface. In some aspects of the invention the rate center, RF coverage, and base station information are databases hosted in the computer. Step 102 includes receiving the address via the computer interface. Then, a further step follows Step 110. Step 112 provides the service availability assignment for the received address via the computer interface. In some aspects of the invention, Steps 102 and 112 include the computer interface and the computer being linked through a communications network including landline and wireless connections.

Figure 6A:
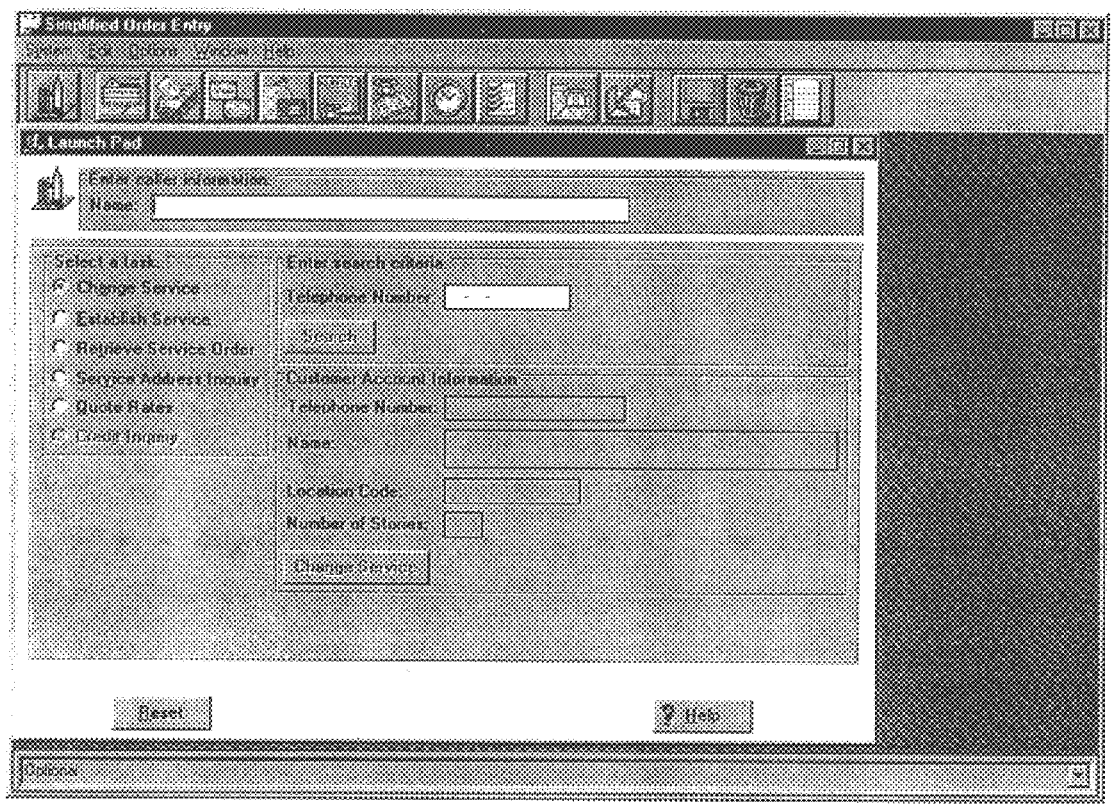
FIGS. 6a through 6g illustrate interface menus to submit services inquires and receive interface responses in accordance with the present invention.
Figure 6B:
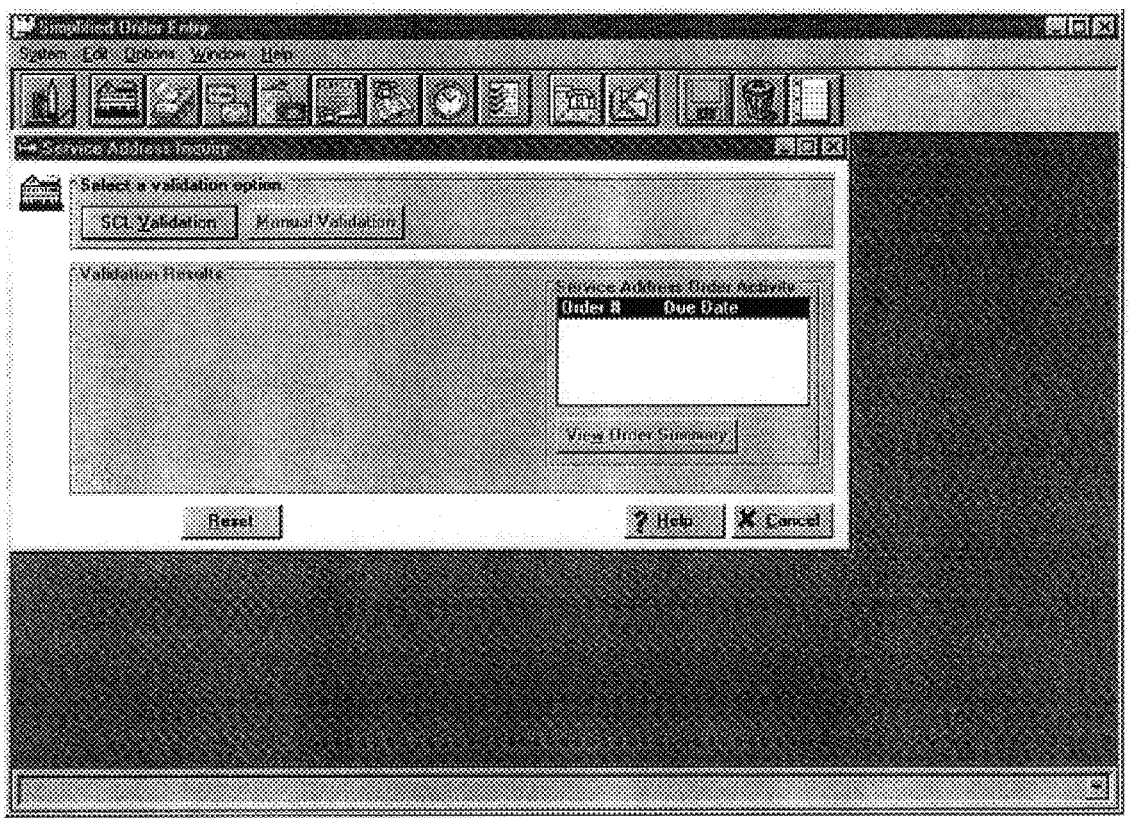

FIGS. 6*a* through 6*g* illustrate interface menus to submit services inquires and receive interface responses in accordance with the present invention. FIG. 6*a* is an exemplary order, formed as a part of graphical user interface (GUI) to a computer system, which a customer representative uses to access the order entry system. FIG. 6*b* is a form brought up on the computer screen for the customer service representative to use in initiating a customer request for a new FWS service.

Figure 6C:
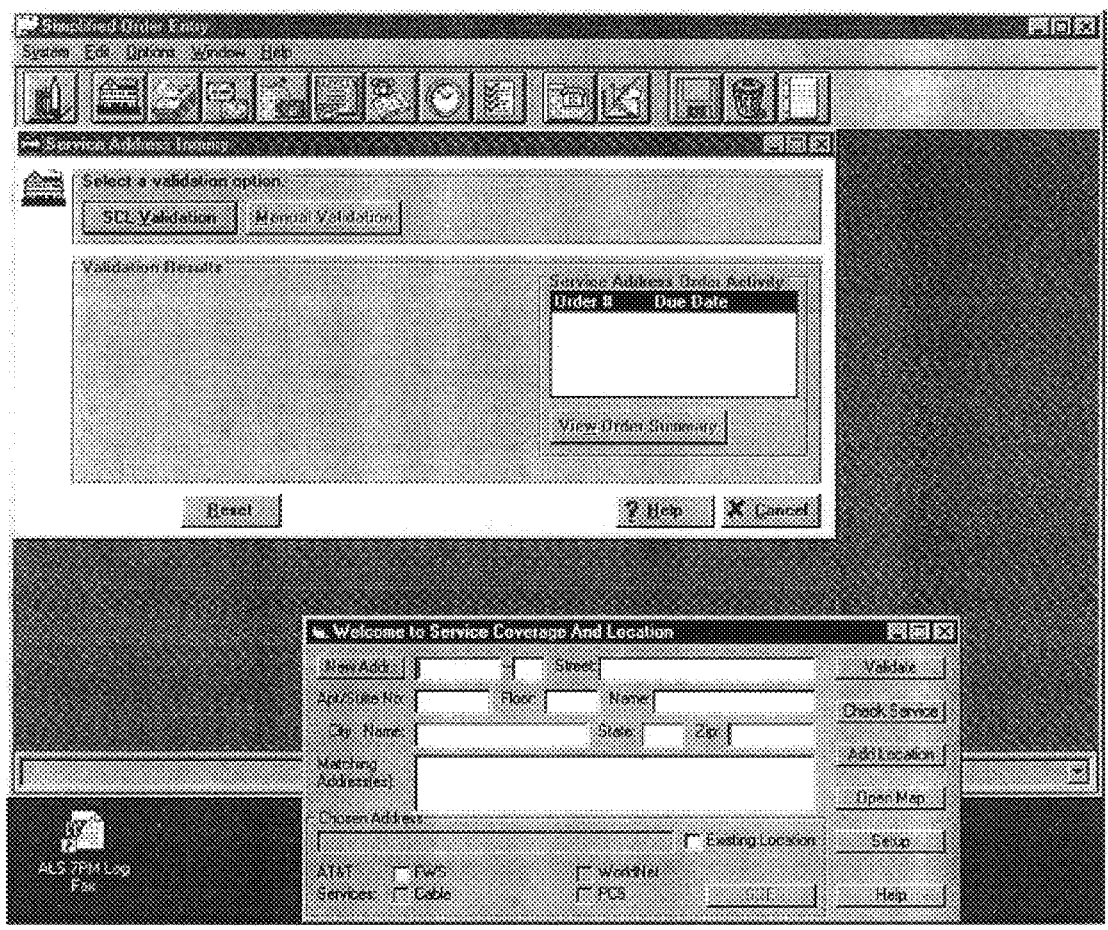
Figure 6D:
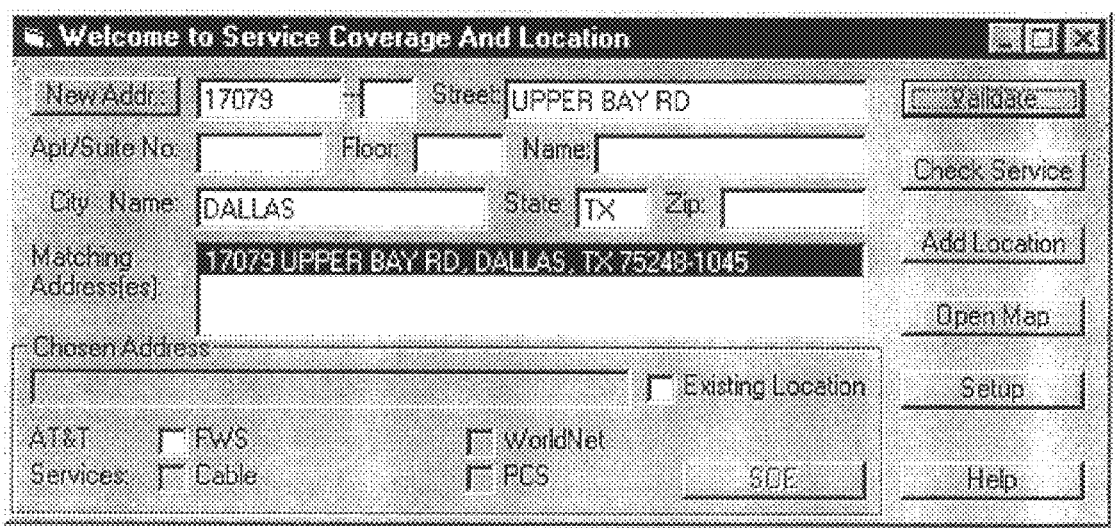
Figure 6E:
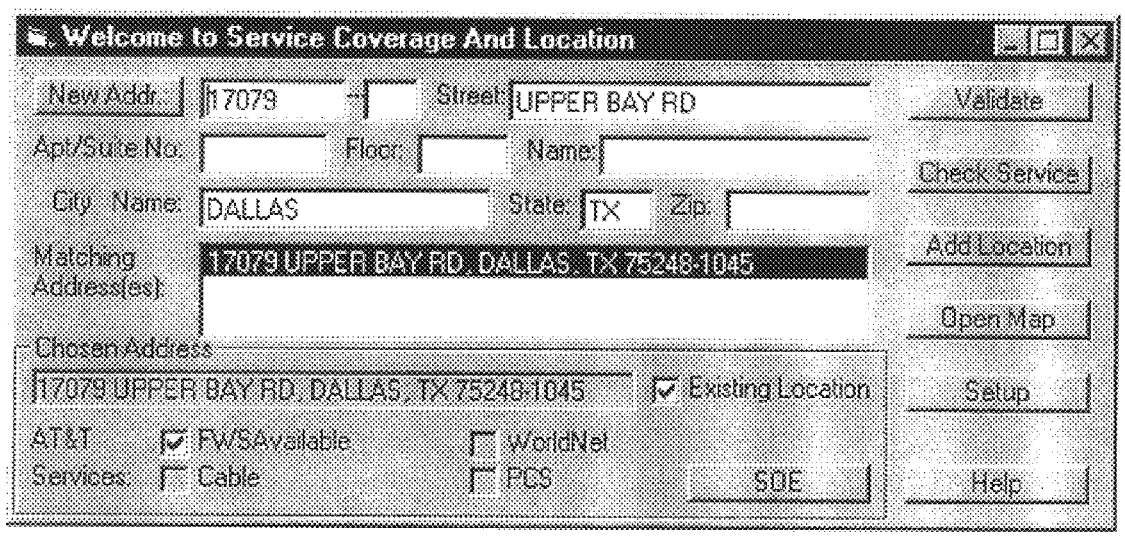

FIG. 6*c* is the SCL client interface. In FIG. 6*d* the customer service representative has entered the address of the new subscriber. This is the only time in the process that the address needs to be typed by the customer service representative. In response to pressing the "Validate" button, the SCL server validates the address to determine if it geocoded properly. In FIG. 6*e* the customer service representative has clicked a button ("Check Service") to submit the address to the SCL server. The SCL server processes the address submission as explained in the description of FIG. 5. The service available is shown on the screen as a result. If the address entered is that of a previous customer, the "Existing Service" box will be checked.

Figure 6F:
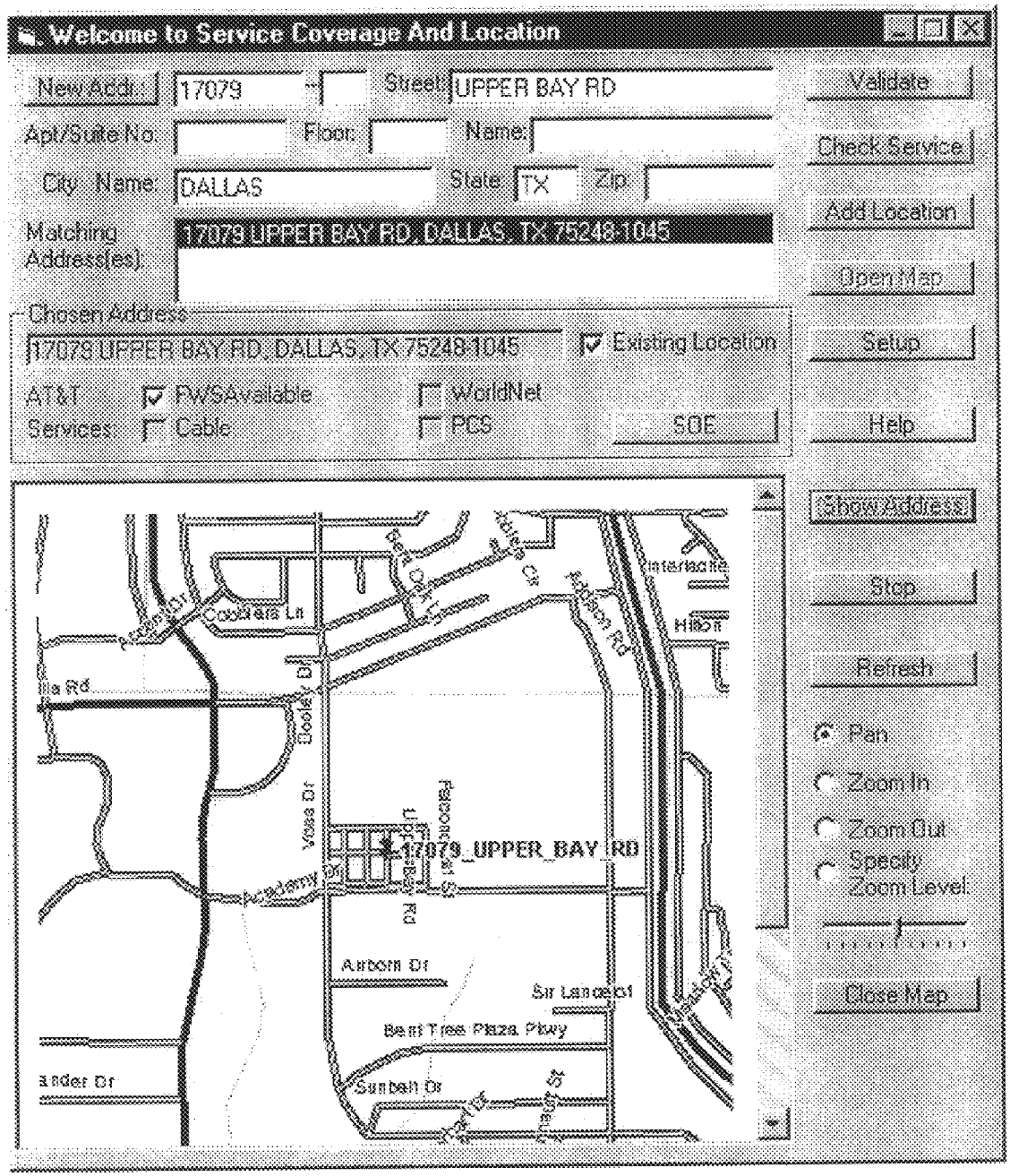
Figure 6G:
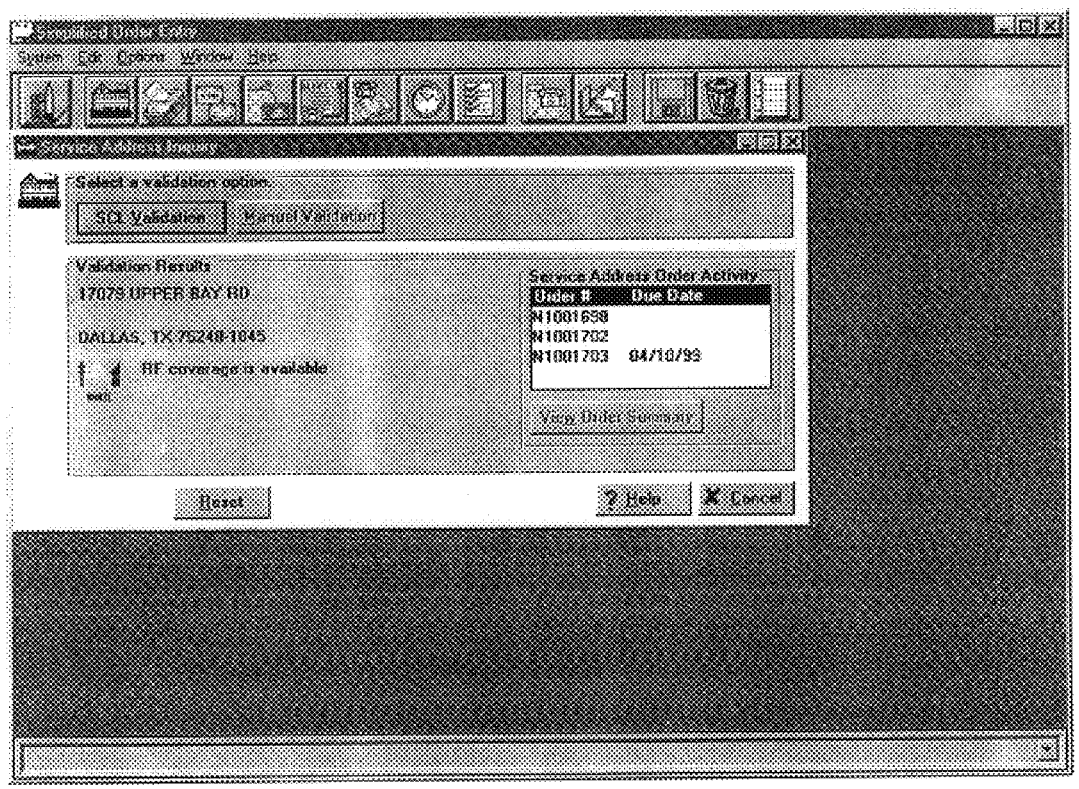

Optionally, the customer service representative can pull the entered address up on a map, as shown in FIG. 6*f*. This permits the customer service representative to ask questions concerning the location. The customer service representative can pan in or out to further the inquiry. In FIG. 6*g* the customer service representative clicks a button to send the results, including rate center and base station, to the order entry system which will, in turn, assign a telephone number and create a workorder for installation.

Figure 7:
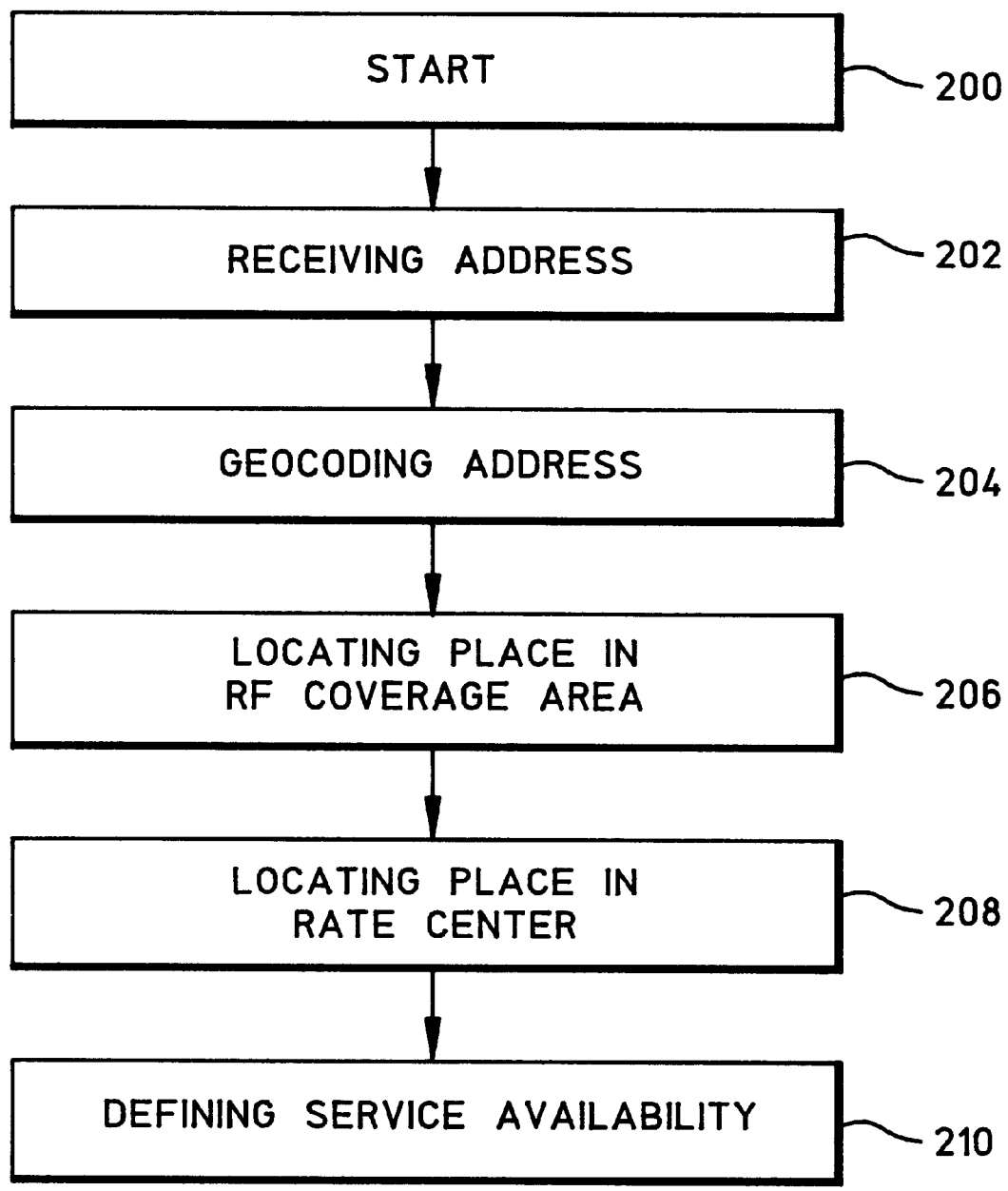
FIG. 7 illustrates another aspect of the method for checking the availability of service in a communications network.

FIG. 7 illustrates another aspect of the method for automatically determining the availability of service in a communications network. Step 200 begins with a fixed wireless system (FWS) communications network which includes rate center and RF coverage area information. Step 202 receives an address for the determination of service availability. Step 204 geocodes the address to create a place. That is, the received address in converted into a position that is geographically located, called a "place". Step 206 locates the place in an area of RF coverage. Step 208 locates the place in a rate center. Step 210 is a product where service availability is automatically defined in response to an address. Step 210 makes service available to the place, when the RF coverage of the place is adequate.

In some aspects of the method the communications network includes a plurality of base stations to provide the RF coverage, with business rules to govern the availability and capacity of each base station. There is also a relationship between RF coverage areas and base stations. The location of the place in an area of RF coverage in Step 206 includes assigning the place to a base station area. The assignment of service availability in response to the adequacy of RF coverage in Step 210 includes assigning service availability to the place in response to the business rules of the assigned base station.

A system and method have been defined above for automatically defining service availability to a potential subscriber on the basis of street address. The system and method are advantageously applicable to fixed-position wireless systems that have the additional complication of determining the RF coverage available to subscribers and the base station business rules to be applied. Other variations and embodiments of this invention will occur to those skilled in the art.

What is claimed is:

1. In a communications network including rate center information for a plurality of rate centers and radio frequency (RF) coverage information for a plurality of RF coverage areas, a method for determining the availability of wireless service to subscribers comprising:

receiving a premises address for determination of wireless service availability in a rate center;

acessing the rate center and RF coverage information in response to the premises address;

determining, from the rate center information, a rate center in which the premises address is located;

determining, from the RF coverage information, an RF coverage area in which the premises address is located; and if the premises address is located within an RF coverage area, assigning service to a remote unit at the address.

2. The method of claim 1 wherein the communication network includes a rule-set applicable to each RF coverage area, and in which assigning service to the remote unit at the premises address includes:

determining a selected rule-set for the RF coverage area in which the premises address is located; and assigning service to the premises address according to the selected reset.

3. The method of claim 2 wherein the communicatons network includes a plurality of base stations to provide RF operations in the plurality of RF coverage areas, wherein the RF coverage information includes the relationship between base stations and RF coverage areas, and business rules associated with each base station;

wherein the determination of the selected rule-set includes selecting a base station corresponding to the RF coverage area in which the premises address is located; and wherein the assigning of service availability to the premises address in response to the RF coverage rule-set includes applying the business rules of the selected base station to the remote unit at the premises address.

4. The method of claim 3 in which the assignment of service availability includes assigning service availability to the premises address in response to the selected base station business rules.

5. The method of claim 4 wherein the communications network base station business rules include rules concerning base station capacity and base station availability.

6. The method of claim 5 in which the assignment of service availability includes assigning service availability from the options including service granted, service unavailable due to no base station coverage, service unavailable due to poor RF coverage, service unavailable due to base station low capacity, and service unavailable due to the base station being unavailable for use.

7. The method of claim 1 in which the accessing of rate center information includes converting the received premises address into a geographic location.

8. The method of claim 7 in which the determination of the RF coverage area includes converting the received premises address into a geographic location.

9. The method of claim 8 wherein the communications network includes a computer, with a computer interface, and wherein the rate center information and RF coverage area information are hosted in the computer;

in which the receiving of an address includes receiving the premises address via the computer interface; and the method further comprising;

providing the service availability assignment for the received premises address via the computer interface.

10. The method of claim 9 in which receiving the premises address includes the computer interface and the computer being linked through a communications network including landline and wireless telephones.

11. A communications network in accordance with claim 1, wherein the premises address is a street address.

12. A system for determining the availability of wireless communications services to a communications network subscriber with a premises address, the system comprising:

a service coverage and location (SCL) server including a database of rate centers in the communications network, said SCL including an application to convert premises addresses to geographically located positions, and to determine a rate center associated with a premises address, said SCL server including a database of radio frequency (RF) coverage areas, said SCL server application locating the premises address in an area of RF coverage and determining the availabillty of service in response to the RF coverage area in which the premises address is located, said SCL including a port to accept the premises address, and to provide the determined rate center and service availability; and an SCL user interface connected to said SCL to provide the premises address to said SCL, and to accept the determined rate center and availability from said SCL.

13. The system of claim 12 further comprising:

a plurality of base stations to provide the areas of RF coverage; and in which said SCL server includes a base station database, said base station database including a set of business rules associated with each base station, said SCL application generating a relationship between base stations and areas of RF coverage and selecting the base station associated with the RF coverage area in which the premises address is located, said application determining service availability in response to the business rules that are applied to the premises address.

14. The system of claim 13 further comprising:

a plurality of wireless remote unit, each said remote unit corresponding to a premises address where service is available.

15. The system of claim 13 in which said SCL user interface accepts RF coverage and business rule updates, and in which the updates are communicated to said SCL server to update said RF coverage and business rule databases.

16. The system of claim 12 in which said SCL server and said SCL server interface are connected through communications systems including landline and wireless telephones.

17. The system of claim 12 further comprising:

an SCL interface display including;

a menu to enter the premises address of the subscriber;

a menu indicating the availability of wireless service; and a map indicating the geographical location of the premises address.

18. A system in accordance with claim 12, wherein the premises address is a street address.

19. A method for determining the availability of wireless service to a premises address in a communications network, the communications network comprising a plurality of base stations providing a plurality of radio frequency (RF) service coverage areas and including rate center information for a plurality of rate centers, RF coverage information for the plurality of RF service coverage areas and a rule-set applicable to each RF coverage area, the RF coverage information including the relationship between base stations and RF coverage areas, and business rules associated with each base station, the method comprising:

receiving the premises address for determination of wireless service availability in a rate center;

accessing rate center and RF coverage information in response to the premises address;

determining, from the rate center information, a rate center in which the premises address is located;

determining, from the RF coverage information, an RF coverage area in which the premises addresses located;

determining a selected rule-set for the RF coverage area in which the premises address is located, the determination of the selected rule-set including selection of a base station corresponding to the RF coverage area in which the premises address is located; and assigning service to the premises address if the premises address is located with an RF coverage area an in accordance with the selected rule-set, wherein the assigning of service availability to the premises address in response to the RF coverage rule-set includes applying the business rules of the selected base station to the remote unit at the premises address.

20. The method of claim 19 in which the assignment of service availability includes assigning service availability to the premises address in response to the selected base station business rules.

21. The method of claim 20 wherein the communications network base station business rules include rules concerning base station capacity and base station availability.

22. The method of claim 21 in which the assignment of service availability includes assigning service availability from the options including service granted, service unavailable due to no base station coverage, service unavailable due to poor RF coverage, service unavailable due to base station low capacity, and service unavailable due to the base station being unavailable for use.

23. A method in accordance with claim 19, wherein the premises address is a street address.

24. A method for determining the availability of service in a wireless communications network including a plurality of base stations to provide areas of radio frequency (RF) coverage and including information concerning rate centers, the base stations having business rules governing the availability and capacity of each base station, and wherein a relationship exists between RF coverage areas and base stations, the method comprising:

receiving a premises address for the determination of service availability;

geocoding the premises address to create a place;

locating the place in an area of RF coverage;

locating the place in a rate center;

assigning the place to a base station; and assigning service availability to the place in response to the business rules of the assigned base station and the adequacy of RF coverage.

25. A method in accordance with claim 24, wherein the premises address is a street address.

26. A system for determining the availability of wireless communications services to a communications network subscriber with a premises address, the system comprising:

a service coverage and location (SCL) server including a database of rate centers in the communications network, said SCL including an application to convert premises addresses to geographically located positions, and to determine a rate center associated with a premises address, said SCL server including a database of radio frequency (RF) coverage areas, said SCL server application locating the premises address in an area of RF coverage and determining the availability of service in response to the RF coverage area in which the premises address is located, said SCL including a port to accept the premises address, and to provide the determined rate center and service availability:

an SCC user interface connected to said SCL to provide the premises address to said SCL, and to accept the determined rate center and availability from said SCL; and a plurality of base stations to provide the areas of RF coverage; and in which said SCL server includes a base station database, said base station database including a set of business rules associated with each base station, said SCL application generating a relationship between base stations and areas of RF coverage and selecting the base station associated with the RF coverage area in which the premises address is located, said application determining service availability in response to the business rules that are applied to the premises address.

27. The system of claim 26 further comprising:

a plurality of wireless remote units, each said remote unit corresponding to a premises address where service is available.

28. The system of claim 26 in which said SCL user interface accepts RF coverage and business rule updates, and in which the updates are communicated to said SCL server to update said RF coverage and business rule databases.

29. The system of claim 26 in which said SCL server and said SCL server interface are connected through communications systems including landline and wireless telephones.

30. The system of claim 26 further comprising:

an SCL interface display including;

a menu to enter the premises address of the subscriber;

a menu indicating the availability of wireless service; and a map indicating the geographical location of the premises address.

31. A system in accordance with claim 26, wherein the premises address is a street address.

32. A method of providing wireless service to a premises through a communications network, the method comprising:

receiving an address of the premises;

determining a rate center containing the address;

accessing radio frequency (RF) coverage information for a plurality of radio frequency (RF) coverage areas provided by a plurality of base stations, the RF coverage information including a relationship between the plurality of base stations and the plurality RF coverage areas; and assigning wireless service to the promises if the premises is located within an RF coverage area of the plurality of RF coverage areas.

33. A method in accordance with claim 32, the RF coverage information comprising business rules for the plurality of base stations, wherein the assigning the wireless service comprises:

assigning the wireless service in accordance with the business rules.

34. A method in accordance with claim 33, wherein the business rules include rules concerning base station capacity and base station availability.

35. A method in accordance with claim 34, wherein the assigning wireless service comprises assigning wireless service from options including service granted, service unavailable due to no base station coverage, service unavailable due to poor RF coverage, service unavailable due to base station low capacity, and service unavailable due to the base station being unavailable for use.

36. A method in accordance with claim 32, further comprising converting the received address into a geographic location.

37. A method in accordance with claim 32, wherein the communications network includes a computer, with a computer interface, and wherein the rate center information and RF coverage area information are hosted in the computer; wherein the receiving of an address includes receiving the address via the computer interface, the method further comprising:

providing a service availability assignment for the received address via the computer interface.

38. A method in accordance with claim 32, wherein the address is a street address.

39. A system for determining the availability of wireless communications services to a communications network subscriber with a premises address, the system comprising:

a plurality of base stations providing a plurality of RF coverage areas; and a service coverage and location (SCL) server comprising:

a port to accept the premises address and to provide a determined rate center and service availability;

a database of rate centers in the communications network;

a database of the radio frequency (RF) coverage areas, and a server application to convert addresses to geographically located positions and to determine a rate center associated with the premises address, the server application including code to locate the premises address in an area of RF coverage and to determine the availability of service in response to the RF coverage area in which the premises address is located.

40. A system in accordance with claim 39, wherein the SCL server further comprises a base station database including a set of business rules associated with the plurality of base stations, the server application generating a relationship between base stations and areas of RF coverage and selecting the base station associated with the RF coverage area in which the premise address is located, the server application determining service availability in response to the business rules that are applied to the premises address.

41. A system in accordance with claim 40, further comprising:

a user interface connected to the SCL server to provide the premises address to said SCL server and to accept the determined rate center and service availability from the SCL server.

42. A system in accordance with claim 39, wherein the premises address is a street address.

* * * * *